United States Patent [19]

Nishimura

[11] Patent Number: 5,400,435
[45] Date of Patent: Mar. 21, 1995

[54] HIGH SPEED FUZZY CONTROLLER

[75] Inventor: Kiyoshi Nishimura, Kyoto, Japan

[73] Assignee: Rohm Co. Ltd., Kyoto, Japan

[21] Appl. No.: 123,995

[22] Filed: Sep. 21, 1993

[30] Foreign Application Priority Data

Sep. 25, 1992 [JP] Japan .................................. 4-256085

[51] Int. Cl.$^6$ .............................................. G06F 15/18
[52] U.S. Cl. ........................................ 395/3; 395/61; 395/900
[58] Field of Search ......................... 395/3, 11, 900, 61

[56] References Cited

U.S. PATENT DOCUMENTS 4,864,490  9/1989  Nomoto et al. ........................ 395/11
5,193,144  3/1993  Tsutsumi ................................ 395/76

OTHER PUBLICATIONS

Fuzzy Fundamentals E. Cox Oct. 1992 pp. 58–61.
A VLSI Fuzzy Logic Controller With Reconfigurable, Cascadable Architecture H. Watanabe Apr. 1990 pp. 376–382.
Architecture of a CMOS Fuzzy Logic Controller with optimized memory organization and operator design H. Eichfeld et al. Mar. 1992 pp. 1317–1323.

Primary Examiner—Allen R. MacDonald
Assistant Examiner—Richemond Dorvil
Attorney, Agent, or Firm—Nikaido, Marmelstein, Murray & Oram

[57] ABSTRACT

A fuzzy controller includes a fuzzy reasoner, a rule storage, a membership function storage and an extractor. The rule and the membership function storages are constituted by rewritable memories such as an EEPROM, and provide to the fuzzy reasoner a reasoning rule and a membership function, respectively. The extractor provides, in accordance with an input and an output signals of the fuzzy reasoner, a reasoning rule and a membership function stored therein in advance to the rule and membership function storages. The data previously stored in the rule and membership function storages are replaced by the data transmitted from the extractor.

11 Claims, 2 Drawing Sheets

HIGH SPEED FUZZY CONTROLLER

BACKGROUND OF THE INVENTION

1. Field of the Invention

The present invention relates to a fuzzy controller.

2. Description of the Prior Art

Reasoning rules and membership functions are essential to fuzzy control. Fuzzy control by microcomputers is currently used to control various appliances. In the microcomputers, the reasoning rules and membership functions are realized by means of software.

According to a currently-used method of fuzzy control by the microcomputers, a control signal is produced as a result of fuzzy reasoning based on a reasoning rule and a membership function while the reasoning rule and membership function are being produced based on an input data representative of a phenomenon of, for example, an appliance to be controlled. The results of calculation to find a minimum value and a maximum value of the input data are successively stored in a random access memory (RAM). It is very easy to design software to specify how each result stored in the RAM is related. Such software corresponds to the determination of the membership functions. Thus, the membership functions are easily realized by means of software.

As the reasoning rule, for example, whether multiplication or division is performed is determined. Since in the microcomputers this corresponds to the determination of which instruction to use, the reasoning rules are also easily realized by means of software.

In the case of fuzzy control by means of software, however, the processing speed is low since the processing by means of software is constituted by many processing steps. Although the low processing speed does not matter in appliances such as washing machines and air conditioners not requiring very high control speed, it presents problems when the fuzzy controller is used for high-speed control such as the high-speed plant control and the control to produce optima for a chemical reaction, since the low-speed fuzzy control cannot cope with such plant processing and chemical reaction.

Therefore, to cope with such high-speed control, it is preferable to realize the reasoning rules and membership functions by means of hardware. In conventional hardware fuzzy controllers, the reasoning rules and membership functions are stored in a read only memory (ROM).

However, to store the reasoning rules and membership functions, large-capacity ROMs are required. This increases the size and hinders the realization of a one-chip fuzzy controller.

SUMMARY OF THE INVENTION

An object of the present invention is to provide a one-chip high-speed fuzzy controller where the area occupied by a rule storage and a membership function storage is small.

To achieve the above-mentioned object, a fuzzy controller of the present invention is provided on a one-chip semiconductor substrate with a fuzzy reasoner, a rule storage for providing a reasoning rule to the fuzzy reasoner, the rule storage being constituted by a rewritable memory, a membership function storage for providing a membership function to the fuzzy reasoner, the membership function storage being constituted by a rewritable memory, and an extractor for providing to the rule storage and the membership function storage a reasoning rule and a membership function produced based on an input signal and an output signal of the fuzzy reasoner. In the fuzzy controller, data stored in the rule storage and the membership function storage are rewritten to data transmitted from the extractor.

Alternatively, a fuzzy controller of the present invention is provided on a one-chip semiconductor substrate with a fuzzy reasoner, a rule storage for providing a reasoning rule to the fuzzy reasoner, the rule storage being constituted by a rewritable memory, a membership function storage for providing a membership function to the fuzzy reasoner, the membership function storage being constituted by a rewritable memory, and terminals connected to said rule storage and said membership function storage, respectively, so that data stored in the rule storage and the membership function storage are rewritten to data transmitted from an external device.

According to such features, the area occupied by the rule storage and the membership function storage is small since the reasoning rules and membership functions stored in these storages are successively rewritten. Further, high processing speed is realized since the reasoning rules and membership functions produced through simulation and stored in the extractor in advance are successively transferred to the rule storage and the membership function storage to rewrite the previous data and are used for fuzzy reasoning when the fuzzy controller is actually used.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
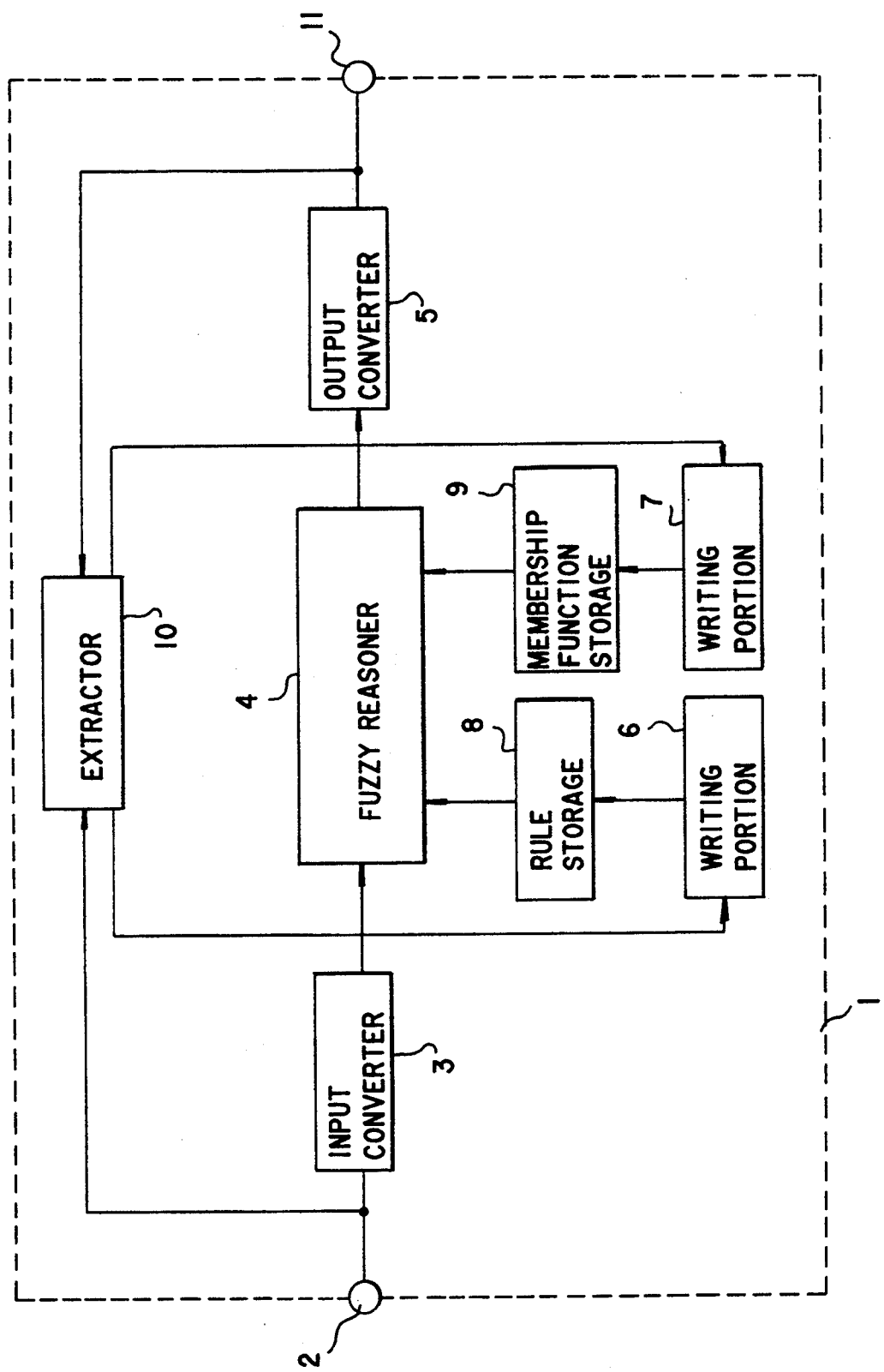
FIG. 1 is a block circuit diagram of a fuzzy controller embodying the present invention.

Referring to FIG. 1 showing an embodiment of the present invention, dotted line 1 shows that the elements enclosed therein are provided on a one-chip semiconductor substrate, numeral 2 is an input terminal to which signals are input, numeral 3 is an input converter, numeral 4 is a fuzzy reasoner, numeral 5 is an output converter, numerals 6 and 7 are writing portions which are electrically erasable programmable read only memories (EEPROMs), numeral 8 is a rule storage for storing reasoning rules, numeral 9 is a membership function storage for storing membership functions, numeral 10 is an extractor, and numeral 11 is an output terminal.

The rule storage 8 and the membership function storage 9, which are constituted by EEPROMs, receive data from the writing portions 6 and 7, respectively. The data previously-stored in the storages 8 and 9 are rewritten to the received data. The fuzzy reasoner 4 has a control function as well. It receives an input signal supplied through an input terminal 2, receives a reasoning rule and a membership function from the rule storage 8 and the membership function storage 9, respectively, to perform reasoning, and outputs the reasoning result.

The extractor 10 produces reasoning rules and membership functions for fuzzy control based on input signals and fuzzy reasoning outputs during a simulation performed by the fuzzy controller 1 and stores them, and when the fuzzy controller 1 is actually used, the extractor 10 provides the reasoning rule and membership function to the rule storage 8 and the membership function storage 9 via the writing portions 6 and 7, respectively. The input converter 3 converts the format of input signals into a format which is in accordance with the processing format of the fuzzy controller 1. For example, if the fuzzy controller 1 of FIG. 1 is of a serial processing format, parallel input signals will be converted into serial signals. The output converter 5 converts the format of outputs of the fuzzy reasoner 4 into an original format.

In the fuzzy reasoning by the fuzzy reasoner 4 in the fuzzy controller 1 of FIG. 1, first, the reasoning mechanism (i.e. reasoning rules and membership functions) is extracted from a phenomenon (i.e. from input and output signals). This extraction is performed by the extractor 10 during the simulation by the fuzzy controller 1. Specifically, in the fuzzy controller 1, necessary reasoning rules and membership functions are produced through the simulation before the controller is actually used, and stored in the extractor 10. In this case, a plurality of reasoning rules and membership functions are stored in the extractor 10, since it is necessary to change reasoning rules and membership functions according to the progress of the phenomenon.

When the fuzzy controller 1 is actually used, the reasoning rules and membership functions stored in the extractor 10 are successively transferred to the rule storage 8 and the membership function storage 9 via the writing portions 6 and 7. A predetermined control signal is output as a result of reasoning based on the reasoning rules and membership functions stored in the rule storage 8 and the membership function storage 9.

In the actual use, a first reasoning rule and a first membership function stored in the extractor 10 are once written into the writing portion 6 and 7. Then, they are transferred to the rule storage 8 and the membership function storage 9, respectively. The rule storage 8 and the membership function storage 9 store the reasoning rule and membership function transferred from the writing portions 6 and 7, and provide them to the fuzzy reasoner 4.

The fuzzy reasoner 4 chooses (or discards) a maximum value and a minimum value of input signals or calculates an average value thereof based on the reasoning rule. The maximum and minimum values are obtained since the fuzzy control is for controlling a controlled phenomenon to be between the maximum and minimum values. Then, it processes a plurality of calculation results obtained one after another in such way, by relating them in a specific manner. The membership function determines which result is related to which result, or how a result is related to another.

The output of the fuzzy reasoner 4 is provided via the output terminal 11 as a control signal to control, for example, an appliance to be controlled. After having completed the reasoning based on the first reasoning rule and membership function, the fuzzy reasoner 4 sends to the extractor 10 an instruction to output the next reasoning rule and membership function. In response to the instruction, a new reasoning rule and membership function are output by the extractor 10 and transmitted via the writing portions 6 and 7 to the rule storage 8 and the membership function storage 9. The previous reasoning rule and membership function stored in the rule storage 8 and the membership function storage 9 are rewritten (i.e. over-written) to the new reasoning rule and membership function, which are used for fuzzy control this time. Thereafter, the reasoning rules and membership functions stored in the extractor 10 are successively transferred to the rule storage 8 and the membership function storage 9 to rewrite the previous ones, and are used for fuzzy control operations.

In this embodiment, since the reasoning rules and membership functions stored in the extractor 10 are successively transferred to the rule storage 8 and the membership function storage 9 to rewrite the previous ones and are used for fuzzy control operations as described above, high processing speed is realized. Furthermore, the area occupied by the rule storage 8 and the membership function storage 9 on the semiconductor substrate 1 is small compared to the area occupied by a rule storage and a membership function storage constituted by unrewritable ROMs.

Figure 2:
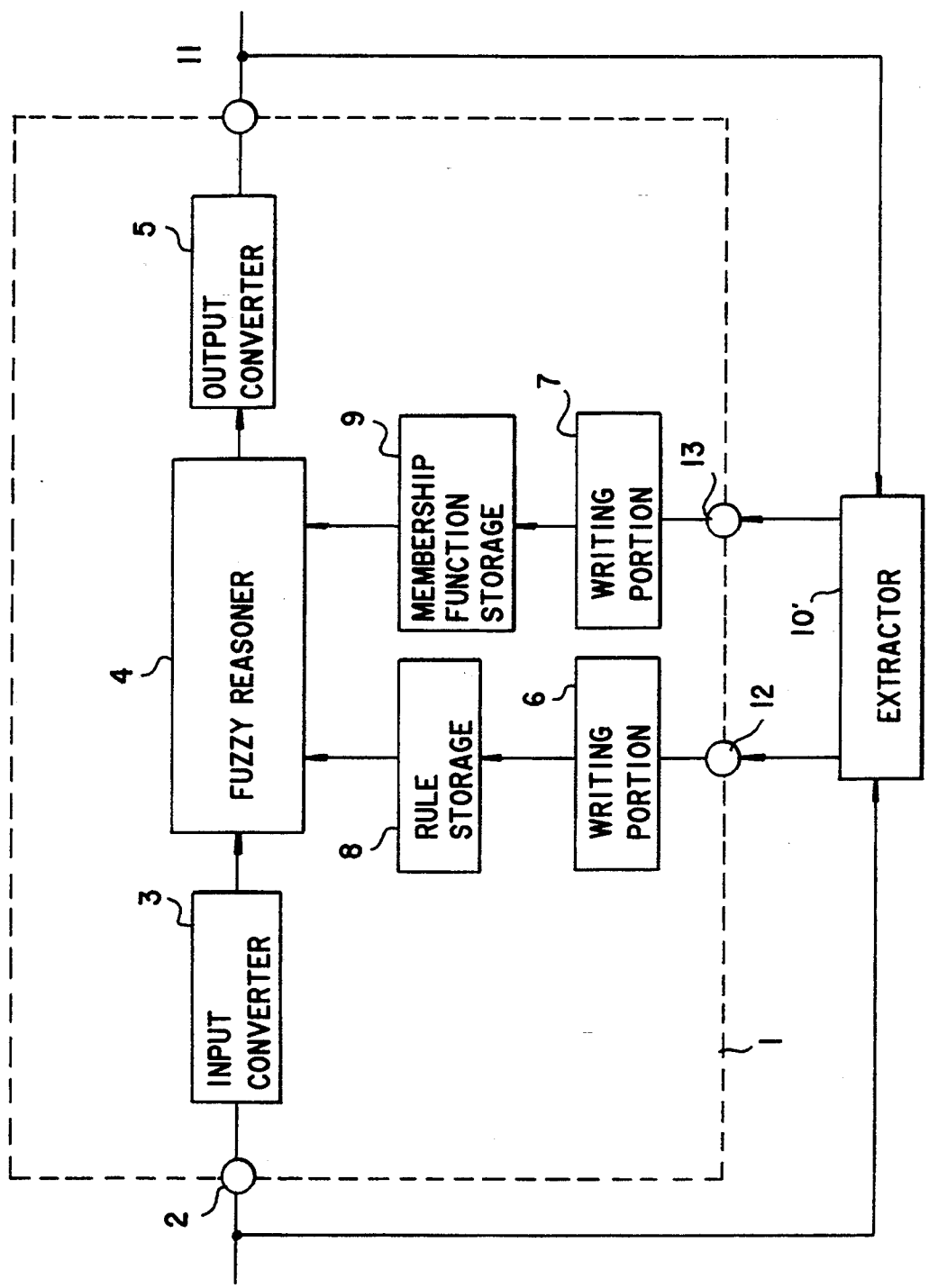
FIG. 2 is a block circuit diagram of another embodiment of the present invention.

Referring now to FIG. 2, there is shown an embodiment where no extractor 10 is provided on the semiconductor substrate 1. The fuzzy controller of this embodiment is provided with terminals 12 and 13. Through these terminals 12 and 13, the reasoning rules and membership functions are transferred from an external extractor 10' via the writing portions 6 and 7 to the rule storage 8 and the membership function storage 9 constituted by EEPROMs. As the external extractor 10', for example, a personal computer may be used. The control operations of this embodiment are performed in a manner similar to that of the embodiment of FIG. 1. In this embodiment of FIG. 2, since the reasoning rules and membership functions are transferred from the external extractor, a semiconductor substrate smaller than that of the embodiment of FIG. 1 may be used.

According to the present invention, since the rule storage and the membership function storage are rewritable, the control operations are performed while the reasoning rules and membership functions are being rewritten, so that the capacities of the rule storage and membership function storage may be small. Moreover, since the reasoning rules and membership functions are produced and stored in the extractor before the fuzzy controller is actually used, the operations of extracting the reasoning rules and membership functions are omitted in the actual use, so that high processing speed is realized. Furthermore, the fuzzy controller of the present invention, which is realized as a one-ship semiconductor device, is of small size.

Obviously, many modifications and variations of the present invention are possible in light of the above teachings. It is therefore to be understood that within the scope of the appended claims, the invention may be practiced other than as specifically described.

What is claimed is:

1. A fuzzy controller formed on a one-chip semiconductor substrate, comprising:
    a fuzzy reasoner for outputting a control signal based on a reasoning rule and a membership function in response to an input signal;
    a rule storage for storing the reasoning rule and outputting thereof to the fuzzy reasoner, said rule storage comprising a non-volatile rewritable memory;
    a membership function storage for storing the membership function and outputting thereof to the fuzzy reasoner, said membership function storage comprising a non-volatile rewritable memory; and an extractor for extracting the reasoning rule and the membership function based on the input signal to the fuzzy reasoner and the control signal produced by the fuzzy reasoner, said reasoning rule and said membership function being transmitted to the rule storage and to the membership function storage, wherein contents of the rule storage and the membership function storage are overwritten when the reasoning rule and the membership function are transmitted thereto from the extractor.

2. A one-chip fuzzy controller according to claim 1, wherein the extractor has a storage for storing a plurality of reasoning rules and membership functions which are stored prior to an actual application of the fuzzy controller, the reasoning rules and the membership functions being successively transmitted therefrom to the reasoning storage and to the membership function storage in response to an instruction from the fuzzy reasoner during an actual application of the fuzzy controller.

3. A one-chip fuzzy controller according to claim 1, wherein said non-volatile rewritable memories for the rule storage and the membership function storage comprise electrically erasable programmable read only memories.

4. A fuzzy controller comprising:
a fuzzy reasoner for outputting a control signal by performing a fuzzy reasoning using an input signal having a predetermined format, a reasoning rule and a membership function, wherein the input signal, the reasoning rule and the membership function are input to said fuzzy reasoner separately;
an input terminal for receiving an input signal;
an input converter for outputting the input signal to the fuzzy reasoner after converting a format of the input signal into the predetermined format;
a rule storage for storing the reasoning rule and outputting thereof to the fuzzy reasoner, said rule storage comprising a non-volatile rewritable memory;
a membership function storage for storing the membership function and outputting thereof to the fuzzy reasoner, said membership function storage comprising a non-volatile rewritable memory;
an output converter for converting a format of the control signal output by the fuzzy reasoner into a same format as the format of the input signal supplied to the input terminal;
an output terminal for transmitting the control signal whose format has been converted by the output converter; and
an extractor for extracting the reasoning rule and the membership function based on the input signal supplied to the input terminal and the control signal whose format has been converted by the output converter,
wherein the reasoning rule and the membership function extracted by the extractor are transmitted to the rule storage and to the membership function storage, and wherein contents of the rule storage and the membership function are overwritten.

5. A fuzzy controller according to claim 4, wherein said non-volatile rewritable memories for the rule storage and the membership function storage comprise electrically erasable programmable read only memories.

6. A fuzzy controller according to claim 5, further comprising a first writing portion and a second writing portion, wherein the reasoning rule is transmitted from the extractor to the rule storage through the first writing portion, and the membership function is transmitted from the extractor to the membership function storage through the second writing portion.

7. A fuzzy controller according to claim 4, which operates in two modes comprising:
a simulation mode in which a plurality of reasoning rules and membership functions are extracted by the extractor; and
an application mode in which the control signal output by the fuzzy reasoner is employed for controlling an object of the fuzzy controller,
wherein the reasoning rules and the membership functions extracted by the extractor in the simulation mode are stored in a storage in the extractor, and the reasoning rules and the membership functions are successively transmitted therefrom to the reasoning storage and to the membership function storage in response to an instruction from the fuzzy reasoner in the application mode.

8. A fuzzy controller formed on a one-chip semiconductor substrate, comprising:
a fuzzy reasoner for outputting a control signal based on a reasoning rule and a membership function in response to an input signal;
a rule storage for storing the reasoning rule and outputting thereof to the fuzzy reasoner, said rule storage comprising a non-volatile rewritable memory;
a membership function storage for storing the membership function and outputting thereof to the fuzzy reasoner, said membership function storage comprising a non-volatile rewritable memory;
an input terminal for receiving an input signal, the input signal being transmitted to the fuzzy reasoner;
an output terminal for transmitting the control signal output by the fuzzy reasoner;
a third terminal for transmitting the reasoning rule to the rule storage therethrough from an outside of the fuzzy controller; and
a fourth terminal for transmitting the membership function to the membership function storage therethrough from an outside of the fuzzy controller.

9. A one-chip fuzzy controller according to claim 8, wherein the reasoning rule and the membership function are transmitted from a personal computer to the rule storage and to the membership function storage.

10. A one-chip fuzzy controller according to claim 8, wherein said non-volatile rewritable memories for the rule storage and the membership function storage comprise electrically erasable programmable read only memories.

11. A one-chip fuzzy controller according to claim 8, which further comprising:
an input converter connected to the input terminal and to the fuzzy reasoner for converting a format of the input signal before the input signal is transmitted to the fuzzy reasoner; and
an output converter connected to the fuzzy reasoner and to the output terminal for converting a format of the control signal output by the fuzzy reasoner before the control signal is transmitted through the output terminal.

* * * * *